3,681,311
PROCESS FOR SHORTSTOPPING THE POLYMERIZATION OF ACRYLONITRILE POLYMER COMPOSITIONS
Luigi Patron, Venice, and Sergio Lo Monaco, Mestre, Italy, assignors to Monsanto Company, St. Louis, Mo.
No Drawing. Filed Oct. 7, 1968, Ser. No. 765,620
Claims priority, application Italy, Oct. 6, 1967, 21,313/67
Int. Cl. C08f 3/76, 15/22
U.S. Cl. 260—85.5
6 Claims

ABSTRACT OF THE DISCLOSURE

Hydroxylamine salts have been found to be effective inhibitors and shortstopping agents for the redox catalyzed polymerization of acrylonitrile polymers, particularly where the redox catalyst system is composed of chlorate, chlorite or hypochlorite ions or mixtures thereof in solution, activated by sulfoxy reducing ions.

BACKGROUND OF THE INVENTION

It is known to carry out the polymerization of vinyl compounds and in particular of acrylonitrile alone or in admixture with other ethylenically unsaturated monomers copolymerizable therewith, in an aqueous medium having a pH not exceeding about 5, by using, as a catalyst, a redox system constituted by chlorate or chlorite or hypochlorite ions or mixtures thereof, activated by sulfoxy reducing ions.

It is also known that during the polymerization of vinylic compounds, the chemical and physical properties of the polymer produced such as the viscosity, the molecular weight, the solubility in various solvents, etc. are subject to wide variation. Therefore, in order to obtain a polymer having good commercial properties, it is desirable to have available an effective method that will permit the polymerization to be stopped at any preferred and prefixed time.

Said controlled stopping of the reaction of "short-stopping" is particularly important in the continuous and in the suspension polymerization as the obtained polymer is generally kept for a certain time in contact with the unreacted monomers and with the catalysts before being separated. This causes the production of the polymer to occur under uncontrolled conditions of polymerization.

Thus, for instance, in the polymerization of acrylonitrile alone or with other ethylenically unsaturated monomers copolymerizable therewith, the composition and the physical properties of the polymer just removed from the reaction vessel and immediately filtered are considerably different from those shown by the same polymer when the filtering is postponed even if only by a short period of time, sufficient however, for the residual monomers and the catalysts to react with each other.

It is also known that substances capable of acting as polymerization inhibitors are to be chosen depending on the type of catalytic system used.

Thus, for instance, ethylene diamine tetracetic acid or its alkali metal or alkaline earth metal salts well known are excellent polymerization inhibitors where the polymerization of vinyl compounds is carried out with a catalytic system consisting of persulfate ions activated by sulfur dioxide or by sulfites. However, they have no inhibiting effect on the polymerization of vinyl compounds and in particular of acrylonitrile, when as a catalytic system are used chlorate or chlorite or hypochlorite ions or a mixture of these activated by sulfur dioxide or by sulfites.

In this connection it is of importance that the use of ethylene diamine tetracetic acid or one of its alkali metal or alkaline earth metal salts which are soluble in water, together with the catalytic system constituted by chlorate or chlorite or hypochlorite ions or their mixtures activated by sulfur dioxide, results in the production of white and thermally stable polymers which are particularly suited for being transformed into textile grade fibers.

In the case of the polymerization of vinyl compounds and in particular of acrylonitrile, by means of a catalytic system constituted by chlorate ions activated by sulfoxy reducing ions, it has been proposed to inhibit the polymerization by neutralizing the reaction mass by adding a base.

However, the use of a base as a polymerization inhibitor has the inconvenience of not allowing the complete recovery of the unreacted monomers and to influence negatively the original color and the heat stability of the polymer obtained.

Surprisingly, it has now been found and this forms the object of this invention that it is possible to inhibit or effectively stop the polymerization of acrylonitrile alone or in admixture with one or more ethylenically unsaturated monomers copolymerizable therewith, in which use is made of a catalytic system consisting of chlorate, or chlorite or hypochlorite ions or mixtures thereof activated by sulfoxy reducing ions without the above-cited drawbacks by adding to the reaction mixture a salt of hydroxylamine.

It has also been found that the salts of hydroxylamine not only have the stated inhibiting action but they additionally allow full recovery by distillation of all the unreacted monomers.

Furthermore the chemical and physical characteristics of the acrylonitrile polymer, thus obtained and particularly the original color and the heat stability are of sufficient high quality to permit use thereof in the manufacturing of synthetic fibers.

Furthermore, the polymer obtained according to the process of this invention, although showing properties fully like those of the same polymer obtained by filtering directly and immediately after polymerization, gives origin to much better fibers as to color and heat stability when spinning is conducted in such a way that in its three stages or phases that is: coagulation, stretching and collapsing followed by thermal stabilization, there is no treatment with compounds of a basic character such as a finishing product of an ionic nature.

SUMMARY OF THE INVENTION

The present invention concerns an improved process for polymerizing acrylonitrile alone or in admixture with other ethylenically unsaturated monomers copolymerizable therewith.

More particularly, it relates to a method for shortstopping the polymerization of acrylonitrile polymers in which polymerization, as a catalyst, a redox system constituted by chlorate, chlorite or hypochlorite ions or mixtures thereof, activated by sulfoxy reducing ions is used by means of a hydroxylamine salt.

DESCRIPTION OF PREFERRED EMBODIMENTS

The hydroxylamine salt may be chosen among a wide variety of compounds which react with hydroxylamine to form salts such as: hydrochloride, sulphate, phosphate, oxalate, acetate, and the like. In practice, however, particularly favorable results are obtained by using hydroxylamine hydrochloride or hydroxylamine sulfate.

The quantity of such a salt to be used in the process of this invention, depends on the quantity of chlorate or chlorite or hypochlorite used in the polymerization.

The best results are obtained when the molar ratio of hydroxylamine salt/chlorate or chlorite or hypochlorite is comprised between 0.5:1 and 10:1, but preferably between 1:1 and 5:1.

Of course, there may also be used greater quantities of hydroxylamine salts, but this does not bring further advantages to the process but only leads to a greater consumption of the product, and therefore, increases the cost of the process.

In putting into practice the process of this invention any water soluble compound which provides chlorate or chlorite or hypochlorite ions may be used. Such compounds are well known and comprise: chloric acid or chlorous or hypochlorous acid, the corresponding salts of alkaline, alkaline earth metals or the corresponding water soluble salts of heavy metals as well as the corresponding ammonium salts.

Among these for economical reasons, the sodium or potassium salts are preferred.

By sulfoxy reducing ions are meant ion producing compounds containing oxygen and sulphur in which the valence of the sulphur does not exceed 4. Compounds of this type that may be used in this process include sulphur dioxide and alkaline, alkaline earth metals or ammonium, bisulphites, metabisulphites and thiosulphites.

According to this invention the salts of the hydroxylamine are used for stopping or inhibiting the polymerization of acrylonitrile alone or in admixture with other ethylenically unsaturated monomers copolymerizable therewith where the weight content of acrylonitrile is greater than 85 percent, preferably, and at least 60 percent by weight.

By the expression "ethylenically unsaturated monomers copolymerizable with acrylonitrile" are meant compounds containing the $>C=C<$ group. Among these may be mentioned: ethylene, styrene and the corresponding mono-methyl, dimethyl, ethyl chloro, amino, nitro derivatives; acrylic compounds in general such as acrylic acid, methacrylic acid, alkyl, aryl and aralkyl esters of the acrylic or methacrylic acid, the corresponding amides and the mono-N-alkyl derivatives of the latter, methacrylonitrile, etc.; unsaturated ketones such as methyl-vinyl ketones; vinyl compounds such as vinyl chloride, vinyl acetate, vinyl chloroacetate, vinyl butyrate, vinyl stearate, etc., allyl sulphonic acid and other sulphonated vinylic compounds and their corresponding salts; itaconic acid; cynammic acid; sulphonated cynammic acid; carboxy vinyl phthalic acid etc.; and furthermore p-methyl acrylamide benzene sulphonic acid, p-methyl allyl ether benzene sulphonic acid and the like, and the corresponding salts.

According to this invention the salt of hydroxylamine is added when the stopping of the polymerization is wished, that is, when the properties of the obtained polymer just correspond to those desired. Thus, in the case of a batch polymerization process, the hydroxylamine salt may be added directly into the polymerization vessel or into a successive tank into which the reaction mixture is transferred. In the case of continuous polymerization said short-stopping agent may be added at any point after the polymerization reactor, for instance, in the overflow pipe, in the container tank or in any other vessel into which the polymerization mixture has been transferred.

It is preferred to add the short-stopping agent as soon as the reaction mixture is taken out of the polymerization vessel in order to ensure the full stoppage of the polymerization at the prefixed time.

The short-stopping agents may be added as they are since they are soluble in the aqueous reaction mixtures, or, better still, in aqueous solution relatively concentrated.

The polymers and copolymers of acrylonitrile obtained according to the process object of this invention are very white, have a high heat stability and furthermore they show a high basic dyeability which remains constant by the subsequent treatment with acids or by hydrolysis or during their transformation into fibers.

The fibers obtained by wet or dry spinning of solutions of said polymers in any well known solvent for acrylonitrile polymers such as N,N-dimethylacetamide, N,N-dimethylformamide, ethylene carbonate, dimethylsulfoxide, etc., having a high basic dyeability which will remain unvaried after any treatment with acids.

In order to determine the dyeability of the polymers or copolymers obtained according to this invention as well as of the fibers obtained from said polymers or copolymers, a dyeing is carried out at 100° C. for 2 hours with a solution containing about 7 g./liter of the commercial dyestuff C.I. Basic Blue 22 (purity about 16%), and by spectrophotometry the quantity of fixed dye is measured. This quantity is expressed in weight percentage with respect to the polymer or fiber.

The color of the polymer is measured by a General Electric Integrator spectrophotometer, according to the C.I.E. system of representation and measuring of the color.

According to this system the color is expressed in terms of purity index (PI) and of brightness (B), referred to a Standard illumination which is a source of radication corresponding to a black body heated to 6200° K.

The heat stability, or better still, the heat sensitivity is given by the variation of the purity index ($\Delta$PI) and by the variation of the brightness ($\Delta$B) correspondently of the polymer and of the fiber after heating in a forced air oven for respectively 8 hours at 145° C. for the polymer and 25 minutes at 145° C. for the fiber.

The intrinsic viscosity ($[\eta]$), expressed in dl./g., is determined in dimethylformamide at 25° C. by means of an Ostwald-Fenscher viscosimeter.

The following examples are given for illustrative purposes for more clearly evidencing the inventive concept of this invention.

EXAMPLE 1

Into a 3.76 liter polymerization reactor provided with an overflow pipe and with a stirrer, and maintained at a temperature of 50° C. by a thermostatic bath are fed continuously under stirring.

10.04 g./min. of a mixture constituted by 91.5% by weight of acrylonitrile and 8.5% by weight of methyl acrylate, 50.2 g./min. of an aqueous solution containing 0.0355% by weight of sodium chlorate, 0.703% by weight of sodium bicarbonate for buffering the pH of the reaction mixture to about 3, and 0.004% by weight of the disodium salt of ethylenediamine tetracetic acid, and 0.312 g./min. of sulphur dioxide, metered by a gas flowmeter.

The reaction mixture is continuously discharged by the overflow pipe. One part of this reaction mixture is immediately filtered and the polymer thus obtained (polymer A), after having been washed with deionized water at 50° C. and then dried at 80° C. in a forced air oven, shows the characteristics reported in Table I further on.

The polymerization conversion amounts to 67%.

Another part of the polymerization mixture is discharged through the overflow pipe into a container vessel provided with a stirrer, into which 0.3 g./min. of an aqueous solution of 10% of hydroxylamine sulphate are fed under constant stirring. In the container vessel the polymerization mixture remains for about 1 hour at 50° C.

The polymerization mixture thus treated, is then filtered and the polymer (polymer B), washed with deionized water at 50° C. and successively dried at 80° C. in a forced air oven.

The polymerization conversion amounts to 67% and the polymer obtained (B) shows the characteristics reported on Table I.

From the filtration waters the unreacted monomers are integrally recovered by distillation. The quantity of recovered monomers turns out to be 33% which corresponds exactly to the amount of unreacted monomers calculated on the basis of the polymerization conversion.

The polymers A and B thus obtained are spun under the following conditions: 1000 g. each of polymers A and B are added under stirring to 3000 g. of dimethylacetamide contained in a tank and maintained at a temperature of 5° C., to which 1 g. of oxalic acid as dye stabilizer and 2 g. of an alkyl aryl phosphite have been previously added.

The suspension thus obtained after homogenization and partial deaeration is introduced by a Zenith gear pump into a lamellar heat exchange in which the polymer is solubilized at a temperature of 85° C.

Thereafter the solution is cooled down to 50° C., filtered and gathered in a collector tank kept at 50° C. By means of another Zenith gear-pump, the solution, after further filtering and heating up to 90° C., is fed to a spinneret having 500 holes each of 0.075 mm. diameter. The filaments coming out of this spinneret are coagulated in a coagulating bath containing a mixture formed of 55% of water and 45% of dimethylacetamide with a content in acetic acid of 2%, the bath itself being kept at a temperature of 45° C.

The filaments coming out of the coagulating bath at a speed of 6 m./min. and which contained 30-35% dimethylacetamide and 40-45% water are stretched 555% in boiling water and are at the same time washed. The tow so obtained and which contains less than 1% of solvent is made to pass into a finishing bath containing 0.7% of a lubricant and 0.3% of an antistat. The tow is then dried under tension at 130° C. for a contact time of 30 seconds on rollers heated by steam and crimped after having previously been treated with steam in order to make it more plastic.

Finally, the tow is gathered in a perforated container which is placed into an autoclave for a free shrinkage treatment by steam at 1.7 atm. (130° C.) after a previous disaeration of the autoclave, immission of nitrogen and subsequent evacuation in order to eliminate any air.

This vacuum steam cycle may be repeated several times. The tow undergoes thus a shrinkage of 23%. Subsequently the tow is mechanically crimped under the same conditions specified above and is then cut into 110 mm. staple fibers.

The characteristics of the two types of fibers obtained respectively from polymer A and polymer B are given in the following Table I:

TABLE I

|  | Polymer A | Polymer B |
|---|---|---|
| Properties of the polymer: |  |  |
| Copolymerized methylacrylate, percent | 7.7 | 7.7 |
| Intrinsic viscosity ($\eta$) g./dl | 1.46 | 1.45 |
| Basic dyeability | 11.05 | 11.07 |
| Original color: |  |  |
| PI | 99.4 | 99.4 |
| B | 96.9 | 97.0 |
| Thermal sensitivity: |  |  |
| $\Delta$PI | 7.1 | 7.1 |
| $\Delta$B | 6.2 | 6.1 |
| Properties of the fibers: |  |  |
| Titre, den | 2.9 | 3.0 |
| Tenacity, g./den | 2.60 | 2.65 |
| Elongation at break, percent | 39 | 40 |
| Elastic modulus, g./den | 45 | 45 |
| Yield stress, g./den | 0.95 | 1.00 |
| Knot tenacity (percent) with respect to normal tenacity | 95 | 96 |
| Work to break | 0.60 | 0.62 |
| Original color: |  |  |
| PI | 96.6 | 97.5 |
| B | 85.5 | 86.5 |
| Heat sensitivity: |  |  |
| $\Delta$PI | 2.8 | 2.3 |
| $\Delta$B | 5.0 | 4.8 |
| Basic dyeability | 11.1 | 11.1 |

Similar fiber properties are obtained when the spinning is carried out by using dimethylformamide as a spinning solvent.

Where dimethylformamide is used the spinning solution has a concentration in polymer of 28% and the coagulating bath maintained at 45° C. has a composition of 40% dimethylformamide, 60% water while the other spinning conditions are similar to the above specified ones.

EXAMPLE 2

Example 1 (polymer B) is repeated, however without the addition of hydroxylamine sulphate.

The properties of the polymer as well as also the polymerization conversion at the outlet of the polymerization reactor are equal to those reported by Table I for polymer A; while the properties of the polymer and the polymerization conversion at the outlet of the container vessel and after filtering, washing and drying of the polymer are as follows:

| | |
|---|---|
| Conversion percent | 82 |
| Intrinsic viscosity dl./g | 1.22 |
| Copolymerized methylacrylate percent | 8.2 |
| Basic dyeability do | 12.9 |
| Original color { PI do | 98.6 |
| { B do | 94.6 |
| Heat sensitivity { API | 11.5 |
| { AB | 10.2 |

EXAMPLE 3

By operating according to Example 1 there are continuously fed in:

8.03 g./min. of a mixture of monomers constituted by 92.5% of acrylonitrile and 7.5% of methylmethacrylate, 40.2 g./min. of an aqueous solution containing 0.0578% by weight of sodium chlorate, 0.45% by weight of $NaHCO_3$ and 0.004% of disodium salt of the ethylene diamine tetracetic acid and 0.139 g./min. of $SO_2$.

The polymerization mixture thus obtained is then discharged through an overflow pipe.

One part of this polymerization mixture coming out of the overflow pipe is directly filtered and the polymer thus obtained (polymer C) is washed with deionized water at 50° C. and then dried at 100° C. in a forced air oven. The polymerization conversion amounts to 73% and the properties of the polymer are reported in the following Table II.

The other part of the polymerization mixture coming out of the overflow pipe is discharged into a container tank kept at 50° C. into which is fed under stirring: 1 g./min. of an aqueous solution at 10% of hydroxylamine hydrochloride. In this container tank the polymerization mixture remains for about one hour.

The polymerization mixture coming out of the container is then filtered and the polymer (polymer D) thus obtained is washed with deionized water at 50° C. and then dried at 100° C. in a forced air oven. The polymerization conversion is again 73%.

The properties of this polymer are reported in the following Table II.

TABLE II

|  | Polymer C | Polymer D |
|---|---|---|
| Properties of the polymer: |  |  |
| Copolymerized methylmethacrylate, percent | 7.5 | 7.5 |
| Intrinsic viscosity, dl./g | 1.36 | 1.36 |
| Basic dyeability | 12.2 | 12.1 |
| Original color: |  |  |
| PI | 99.4 | 99.5 |
| B | 96.9 | 97.0 |
| Heat sensitivity: |  |  |
| $\Delta$PI | 5.7 | 5.6 |
| $\Delta$B | 6.1 | 6.1 |
| Properties of the fiber: |  |  |
| Titre, denier | 3.0 | 3.1 |
| Tenacity, g./den | 2.55 | 2.60 |
| Elongation at break, percent | 41 | 40 |
| Elastic modulus, g./den | 44 | 43 |
| Yield stress, g./den | 1.00 | 1.00 |
| Knot tenacity (percent) with respect to the normal tenacity | 96 | 97 |
| Work to break | 0.63 | 0.61 |
| Basic dyeability | 12.05 | 12.15 |
| Original color: |  |  |
| PI | 96.7 | 97.6 |
| B | 85 | 86.5 |
| Heat sensitivity: |  |  |
| $\Delta$PI | 2.9 | 2.4 |
| $\Delta$B | 5.1 | 4.8 |

EXAMPLE 4

Into a 3 l. reactor, prefilled with 2 liters of an aqueous solution of $H_2SO_4$ having a pH equal to 2.5, are fed in during 2 hours:

0.6 g. of sodium chlorate in a 2% aqueous solution,
3.4 g. of $SO_2$ in a 2% aqueous solution,
0.04 g. of disodium salt of the ethylene diaminetetracetic acid in a 0.2% aqueous solution,
4.5 g. of sodium bicarbonate in a 4% aqueous solution, and
200 g. of a mixture containing 92% of acrylonitrile and 8% of vinyl acetate.

At the end of the feeding in 1 g. of hydroxylamine, acetate is added. A sample of this polymerization mixture is taken out immediately before adding the hydroxylamine salt and another sample is taken 60 minutes after the addition of hydroxylamine salt. From these samples the polymer is separated by filtering and is then washed and dried.

In the following Table III are recorded all the properties of the polymers respectively obtained before the addition of hydroxylamine salt and 60 min. after this addition.

TABLE III

| | Before adding the hydroxylamine salt | 60 minutes after addition of the hydroxylamine salt |
|---|---|---|
| Properties of the polymer: | | |
| Conversion, percent | 78 | 78 |
| Copolymerized vinyl acetate, percent | 6.9 | 6.9 |
| Intrinsic viscosity | 1.48 | 1.48 |
| Basic dyeability | 11.47 | 11.45 |
| Original color: | | |
| PI | 99.6 | 99.5 |
| B | 96.2 | 96.3 |
| Heat sensitivity: | | |
| ΔPI | 7.1 | 7.2 |
| ΔB | 6.8 | 6.8 |

Where no hydroxylamine salt is added the polymerization conversion after 60 minutes from the end of the addition of the reacting substances will increase to 85% while the viscosity of the polymer will drop down to 1.15 gl./g. and, at the same time, the color characteristics or the heat stability become worse. The two polymers, that is, the one obtained by direct filtering at the flowing out of the polymerization reaction and that obtained after treatment of the polymerization mixture with hydroxylamine salt are respectively transformed into fibers following the same procedure as those described in Example 1 except that the dimensional stabilization in the autoclave is conducted at 2.5 atm. instead of 1.7 atm.

It is found that the fibers obtained from the polymer after the treatment with the hydroxylamine salt are considerably whiter and much more stable to heat than the others.

What is claimed is:

1. A process for short-stopping the polymerization of a mixture of at least 60 percent acrylonitrile with up to 40 weight percent of at least one other ethylenically unsaturated monomer in which the polymerization is conducted in an aqueous solution in the presence of a catalytic system comprising chlorate, chlorite or hypochlorite ions or a mixture thereof activated by sulfoxy reducing ions comprising adding to the polymerization mixture a hydroxylamine salt selected from the group consisting of hydroxylamine hydrochlorite, hydroxylamine sulphate, hydroxylamine phosphate, hydroxylamine oxalate and hydroxylamine acetate, said hydroxylamine salt being added in a molar ratio of hydroxylamine salt/chlorate, chlorite or hypochlorite of between about 0.5:1 and 10:1, said hydroxylamine salt being added when the polymerization reaches a desired point.

2. The process of claim 1 wherein the mixture consists of at least 85 percent acrylonitrile and up to 15 percent vinyl acetate.

3. The process of claim 1 wherein the hydroxylamine salt is hydroxylamine sulfate.

4. The process of claim 1 wherein the hydroxylamine salt is hydroxylamine acetate.

5. The process of claim 1 wherein the hydroxylamine salt is added in a molar ratio of hydroxylamine salt/chlorate, chlorite or hypochlorite of between about 1:1 and 5:1.

6. The process of claim 1 wherein the hydroxylamine salt is added in aqueous solution.

References Cited

UNITED STATES PATENTS

| 2,672,192 | 3/1954 | Hill | 260—85.5 D |
| 2,751,374 | 6/1956 | Cresswell | 260—85.5 D |
| 2,792,276 | 5/1957 | Kaupin et al. | 260—88.7 |
| 3,153,024 | 10/1964 | Thompson et al. | 260—85.5 Orig. |
| 3,373,147 | 3/1968 | Izumi et al. | 260—88.7 |
| 3,475,390 | 10/1969 | Dinbergs et al. | 260—85.5 N |

OTHER REFERENCES

Chemical Abstracts, vol. 47, 1966e, I. M. Kolthoff et al.

HARRY WONG, JR., Primary Examiner

U.S. Cl. X.R.

260—88.7 F, 88.7 B, 66, 79.3 M, 78.5 R; 264—342